(12) United States Patent
Wei et al.

(10) Patent No.: US 12,014,007 B2
(45) Date of Patent: Jun. 18, 2024

(54) DISPLAY PANEL AND DRIVING METHOD THEREOF AND DISPLAY DEVICE

(71) Applicants: Beijing BOE Display Technology Co., Ltd., Beijing (CN); BOE TECHNOLOGY GROUP CO., LTD., Beijing (CN)

(72) Inventors: Chongguang Wei, Beijing (CN); Weifan Yang, Beijing (CN); Lei Liu, Beijing (CN); Qing Liu, Beijing (CN); Guojuan Zhao, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 247 days.

(21) Appl. No.: 17/435,261

(22) PCT Filed: Nov. 30, 2020

(86) PCT No.: PCT/CN2020/132682
§ 371 (c)(1),
(2) Date: Aug. 31, 2021

(87) PCT Pub. No.: WO2022/110117
PCT Pub. Date: Jun. 2, 2022

(65) Prior Publication Data
US 2023/0176691 A1    Jun. 8, 2023

(51) Int. Cl.
*G06F 3/041* (2006.01)
*G06F 3/0482* (2013.01)
(Continued)

(52) U.S. Cl.
CPC ........ *G06F 3/04184* (2019.05); *G06F 3/0482* (2013.01); *G06F 3/0488* (2013.01);
(Continued)

(58) Field of Classification Search
CPC .. G06F 3/04184; G06F 3/0482; G06F 3/0488; G06F 3/0484; G09G 3/2096;
(Continued)

(56) References Cited

U.S. PATENT DOCUMENTS 10,120,502 B2    11/2018  Yang et al.
10,528,239 B2    1/2020   Mu
(Continued)

FOREIGN PATENT DOCUMENTS

CN    101329609 A    12/2008
CN    102914920 A    2/2013
(Continued)

*Primary Examiner* — Christopher E Leiby
(74) *Attorney, Agent, or Firm* — HOUTTEMAN LAW LLC

(57) ABSTRACT

The present disclosure provides a display panel and a driving method thereof, and a display device. The display panel includes a display zone including at least one touch region and at least one non-touch region. The display panel further includes at least one touch button in the at least one touch region, and the at least one touch button is configured to enable the at least one touch region to display a predetermined screen for a touch operation when touched.

12 Claims, 3 Drawing Sheets

(51) Int. Cl.
*G06F 3/0488* (2022.01)
*G09G 3/20* (2006.01)

(52) U.S. Cl.
CPC ... *G09G 3/2096* (2013.01); *G09G 2310/0267* (2013.01); *G09G 2320/0233* (2013.01); *G09G 2330/021* (2013.01)

(58) Field of Classification Search
CPC ............ G09G 3/36; G09G 2310/0267; G09G 2320/0233; G09G 2330/021
See application file for complete search history.

(56) References Cited

U.S. PATENT DOCUMENTS

| | | | |
|---|---|---|---|
| 2013/0307804 A1* | 11/2013 | Adachi | G06F 3/016 |
| | | | 345/173 |
| 2017/0351373 A1* | 12/2017 | Ueno | G06F 3/04845 |
| 2017/0371494 A1* | 12/2017 | Shingai | G06F 3/0421 |
| 2019/0204968 A1* | 7/2019 | Hur | G06F 3/0412 |
| 2021/0149474 A1* | 5/2021 | Choi | G09G 3/20 |
| 2021/0303027 A1* | 9/2021 | Kim | G06F 1/1686 |
| 2022/0027113 A1* | 1/2022 | Kim | G06F 3/1446 |

FOREIGN PATENT DOCUMENTS

| | | | |
|---|---|---|---|
| CN | 104808905 A | 7/2015 |
| CN | 105183253 A | 12/2015 |
| CN | 105320408 A | 2/2016 |
| CN | 110277072 A | 9/2019 |
| CN | 110321039 A | 10/2019 |
| KR | 20120124230 A | 11/2012 |

\* cited by examiner

DISPLAY PANEL AND DRIVING METHOD THEREOF AND DISPLAY DEVICE

CROSS REFERENCE TO RELATED APPLICATION

This application is a National Phase Application filed under 35 U.S.C. 371 as a national stage of PCT/CN2020/132682, filed on Nov. 30, 2020, the contents of which are incorporated herein by reference in their entirety.

TECHNICAL FIELD

The present disclosure relates to the field of display technology, and in particular to a display panel and a driving method thereof, and a display device.

BACKGROUND

At present, OSD (on screen display) menu physical keys are adopted in MNT (monitor)/TV (television) displays. The OSD menu physical keys are usually provided on a back surface, a side surface or a bottom of a frame of a display.

When a user adjusts parameters of a display, such as brightness and contrast, it is required to switch keys constantly, resulting in cumbersome operation. Meanwhile, with the development of the display to high resolution and high refresh rate, the functions of the display become more and more complex, and more and more functions need to be achieved by physical keys. This also increases the complexity and adjustment time of function selection and switch of the physical keys, and reduces user experience.

SUMMARY

According to one aspect of the present disclosure, a display panel is provided. The display panel includes a display zone including at least one touch region and at least one non-touch region, wherein the display panel further includes at least one touch button in the at least one touch region, and the at least one touch button is configured to enable, when touched, the at least one touch region to display a predetermined screen for a touch operation.

Optionally, the predetermined screen is provided with a plurality of touch keys.

Optionally, the display panel further includes: a timer control register configured to output a touch enable signal and a gate enable signal in a touch stage; a microcontroller configured to output a touch clock synchronization signal and a pulse width modulation wave under a control of the touch enable signal; a power management integrated circuit configured to output a common voltage signal; and a touch integrated circuit configured to output a first redundant parasitic capacitance signal based on the pulse width modulation wave and the common voltage signal, and to output a second redundant parasitic capacitance signal based on the gate enable signal, under a control of the touch clock synchronization signal.

Optionally, the display panel further includes a plurality of pixel units arranged in multiple rows and multiple columns and a plurality of first signal lines in the display zone, wherein each of the at least one touch region is divided into a plurality of sensing sub-regions, each of the plurality of sensing sub-regions includes a selected number of pixel units adjacent to each other, and the plurality of sensing sub-regions correspond to the plurality of first signal lines in a one to one correspondence, and common electrodes of the pixel units in each of the plurality of sensing sub-regions are coupled to a corresponding first signal line, respectively.

Optionally, the display panel further includes one second signal line coupled to common electrodes of pixel units in the at least one non-touch region.

Optionally, the common electrodes of the pixel units in each of the plurality of sensing sub-regions are formed as a single piece, common electrodes of the plurality of sensing sub-regions are independent of each other, and the common electrodes of the pixel units in the at least one non-touch region are formed as a single piece.

Optionally, the display panel further includes at least one sensing and source driving integrated circuit, wherein the at least one sensing and source driving integrated circuit is: coupled to the microcontroller and the touch integrated circuit, and coupled to the pixel units in the plurality of sensing sub-regions through the plurality of first signal lines, and configured: in the touch stage, to sense touch against the at least one touch button and the plurality of touch keys in the predetermined screen through the plurality of first signal lines based on the touch clock synchronization signal and the pulse width modulation wave output by the microcontroller, to send touch signals to the microcontroller, and to send the first redundant parasitic capacitance signal to the plurality of pixel units in the at least one touch region through the plurality of first signal lines and a plurality of data lines respectively, and in a display stage, to send data signals to a plurality of pixel unit columns in the at least one touch region through the plurality of data lines respectively, and to send the common voltage signal to the common electrodes of the plurality of pixel units in the at least one touch region through the plurality of first signal lines, respectively.

Optionally, each of the at least one sensing and source driving integrated circuit includes at least one sensing sub-circuit, at least one source operational amplifier and multiplexers coupled to the at least one sensing sub-circuit and the at least one source operational amplifier in a one to one correspondence, wherein the at least one sensing sub-circuit is further coupled to the microcontroller, and the multiplexers coupled to the at least one sensing sub-circuit and the at least one source operational amplifier in a one to one correspondence are further coupled to the touch integrated circuit respectively, the at least one sensing circuit is coupled to at least some of the plurality of first signal lines through corresponding multiplexers, and the at least one source operational amplifier is coupled to corresponding data lines in the at least one touch region through corresponding multiplexers.

Optionally, the display panel further includes: a gate driving circuit coupled to the touch integrated circuit and a plurality of pixel unit rows in the display zone respectively, wherein the gate driving circuit is configured, in the display stage, to provide a gate driving signal to the plurality of pixel unit rows in the display panel through a plurality of gate lines based on a gate voltage signal output by the touch integrated circuit, and in the touch stage to provide the second redundant parasitic capacitance signal to the plurality of pixel unit rows in the display panel through the plurality of gate lines respectively; and at least one source driving circuit coupled to the microcontroller, wherein the at least one source driving circuit is configured to provide data signals to a plurality of pixel unit columns in the at least one non-touch region through the plurality of data lines under a control of the microcontroller in the display stage.

Optionally, the power management integrated circuit is further coupled to the at least one source driving circuit, and is configured to provide the common voltage signal to the pixel units in the at least one non-touch region via the second signal line through the at least one source driving circuit in the display stage; and the timer control register is further configured to output the gate enable signal to the touch integrated circuit in the display stage, such that the touch integrated circuit outputs the gate voltage signal based on the gate enable signal.

Optionally, the touch stage corresponds to a low level stage of the time synchronization signal of the display panel, a high-level stage of the time synchronization signal corresponds to the display stage of the display panel, the pulse width modulation wave is a touch detection signal of the display panel and has a period less than a period of the time synchronization signal, and the touch enable signal corresponds to a falling edge of the time synchronization signal.

Optionally, an area of the at least one touch region is ¼ of an area of the display zone, the at least one touch region is on a side of the display zone proximal to an edge of the display panel, and the at least one touch button is located at any position in the at least one touch region, and the plurality of touch keys include a screen parameter menu at least including a brightness adjusting bar and a contrast adjusting bar.

According to another aspect of the present disclosure, a display device is further provided. The display device includes the above display panel and a peripheral driving circuit for driving the display panel.

According to another aspect of the present disclosure, a driving method for a display panel is further provided, wherein the display panel includes a display zone including at least one touch region and at least one non-touch region, and each of the at least one touch region includes a touch button, the driving method includes: touching the touch button in the at least one touch region in the display zone of the display panel; and based on a touch against the touch button, displaying a predetermined screen for a touch operation in the at least one touch region, wherein the predetermined screen is provided with a plurality of touch keys.

Optionally, the driving method further includes: in a touch stage, outputting, by a timer control register, a touch enable signal and a gate enable signal; outputting, by a microcontroller, a touch clock synchronization signal and a pulse width modulation wave under a control of the touch enable signal; outputting, by a power management integrated circuit, a common voltage signal; and outputting, by a touch integrated circuit, a first redundant parasitic capacitance signal based on the pulse width modulation wave and the common voltage signal, and a second redundant parasitic capacitance signal based on the gate enable signal, under a control of the touch clock synchronization signal.

Optionally, the driving method further includes: in the touch stage, detecting the touch against at least one touch button and the plurality of touch keys in the predetermined screen, wherein detecting the touch against the at least one touch button and the plurality of touch keys in the predetermined screen includes: inputting the first redundant parasitic capacitance signal to common electrodes of the pixel units and data lines in the at least one touch region of the display panel through multiplexers and a plurality of first signal lines coupled to at least one sensing sub-circuit and through multiplexers coupled to at least one source operational amplifier respectively; inputting, by a gate driving circuit, the second redundant parasitic capacitance signal to gate lines of the pixel units in the at least one touch region of the display panel; and sensing, by the at least one sensing sub-circuit, the touch against the at least one touch button and the plurality of touch keys in the predetermined screen in the at least one touch region via the plurality of first signal lines through corresponding multiplexers based on the touch clock synchronization signal and the pulse width modulation wave output by the microcontroller, and sending touch signals to the microcontroller.

Optionally, the driving method further includes: in a display stage, outputting, by the timer control register, a display enable signal and the gate enable signal; outputting, by the microcontroller, a time synchronization signal under a control of the display enable signal; outputting, by the power management integrated circuit, the common voltage signal; and outputting, by the touch integrated circuit, the common voltage signal provided by the power management integrated circuit under a control of the time synchronization signal, and outputting a gate voltage signal under a control of the gate enable signal.

Optionally, the driving method, in the display stage, further includes: providing the common voltage signal from the touch integrated circuit to the common electrodes of the pixel units in the at least one touch region of the display panel through the multiplexers and the plurality of first signal lines coupled to the at least one sensing sub-circuit and through the multiplexers coupled to the at least one source operational amplifier, and providing data signals to a plurality of pixel unit columns in the at least one touch region of the display panel through a plurality of data lines respectively; providing, by a gate driving circuit, a gate driving signal to a plurality of pixel unit rows in the display panel through a plurality of gate lines based on the gate voltage signal output by the touch integrated circuit; providing, by at least one source driving circuit, data signals to a plurality of pixel unit columns in the at least one non-touch region of the display panel through a plurality of data lines under a control of the time synchronization signal provided by the microcontroller; and providing, by the power management integrated circuit, the common voltage signal to the pixel units in the at least one non-touch region via a second signal line through the at least one source driving circuit.

Optionally, the touch stage corresponds to a low level stage of the time synchronization signal of the display panel, a high-level stage of the time synchronization signal corresponds to the display stage of the display panel, the pulse width modulation wave is a touch detection signal of the display panel and has a period less than a period of the time synchronization signal, the touch enable signal corresponds to a falling edge of the time synchronization signal, and the display enable signal corresponds to a rising edge of the time synchronization signal.

Optionally, the driving method further includes uniformly adjusting the brightness in the at least one touch region and the brightness in the at least one non-touch region.

DETAILED DESCRIPTION

In order to solve cumbersome operation problems due to physical keys of an OSD menu of a current display, to improve working efficiency of a user (such as switching application scenarios quickly), to achieve a real borderless design of a product and increase touch experience, the present disclosure provides a touch display solution of adding a local touch region on a display panel, thus replacing the OSD menu. Specifically, in the present disclosure, touch function is achieved in some regions of a conventional display (e.g., ¼ of a region of the display on its right side) by adding touch design on the display panel (i.e., adding a touch function circuit design to a circuit), thereby replacing OSD physical keys and increasing user touch function experience. In addition, compared with a full screen touch display, the local touch display has obvious cost advantages, wider range of application, and higher market value, and can be quickly applied to products.

Figure 1:
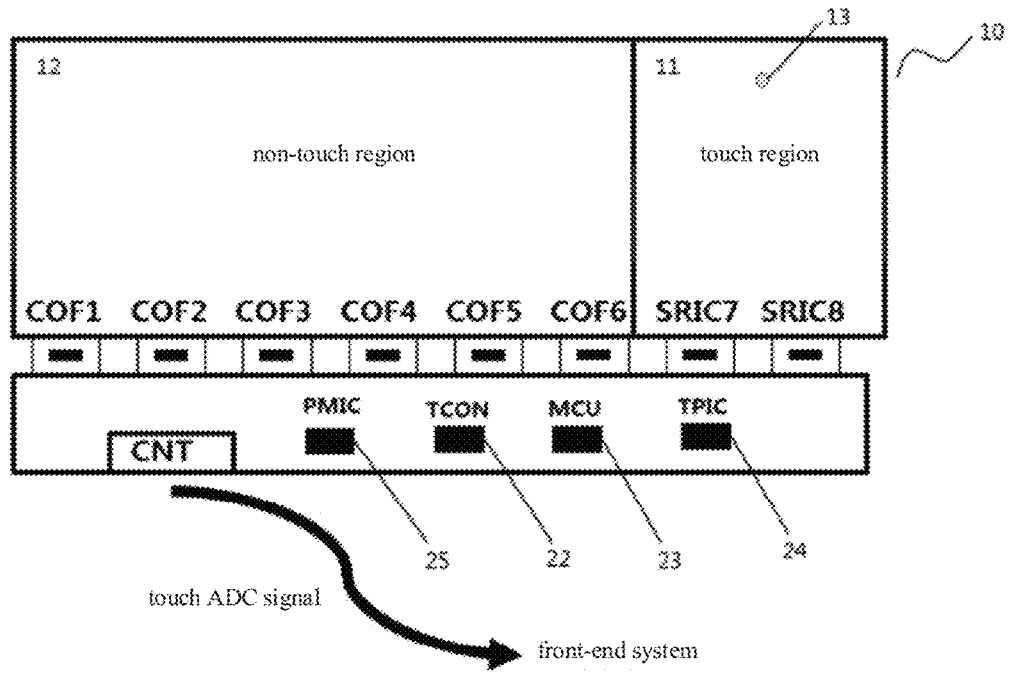
FIG. 1 is a schematic diagram of a display panel according to an embodiment of the present disclosure.

According to an aspect of the present disclosure, a display panel is provided, as shown in FIG. 1, a schematic diagram of a display panel according to an embodiment of the present disclosure is shown. As shown in FIG. 1, a display panel 10 includes a display zone, which includes at least one touch region 11 and at least one non-touch region 12. The at least one touch region 11 is configured to display at least one touch button 13 when touched. The at least one touch button 13 is configured to display a predetermined screen capable of performing touch operation in the at least one touch region 11 when touched. The predetermined screen (a screen menu, e.g., an OSD menu) capable of performing the touch operation may include a plurality of touch keys to adjust parameters of the display panel 10 by touch. That is, the display zone of the display panel 10 may be divided into at least two zones, one of which may be the touch region 11 in which the touch operation may be performed and the other may be the non-touch region 12 in which only conventional display may be performed without the touch operation. Control information in a memory may be adjusted by touching the at least one touch button 13 and the predetermined screen including the plurality of touch keys, to perform display in the display zone, such as changing the display brightness. Optionally, an area of the at least one touch region 11 may be ¼ of an area of the display zone, and the at least one touch region 11 may be on a side of the display zone proximal to an edge of the display panel.

The at least one touch region 11 is configured to display the predetermined screen (for example, a screen control menu) capable of performing the touch operation when touched. Since the touch operation may be performed on the touch region 11, the present disclosure may adopt a touch menu replacing OSD physical keys to adjust the parameters of the display panel (such as brightness, contrast, etc.), thus improving user function experience. Further, the parameter adjustment of the screen menu may be configured in a progress bar mode to further improve the user function experience. Moreover, the screen menu may further include other function keys, such as handwriting input keys, function prompt keys, and the like. By using corresponding control algorithms, any operation that can be achieved in a touch panel in the related art can be achieved in the touch region 11.

Figure 5:
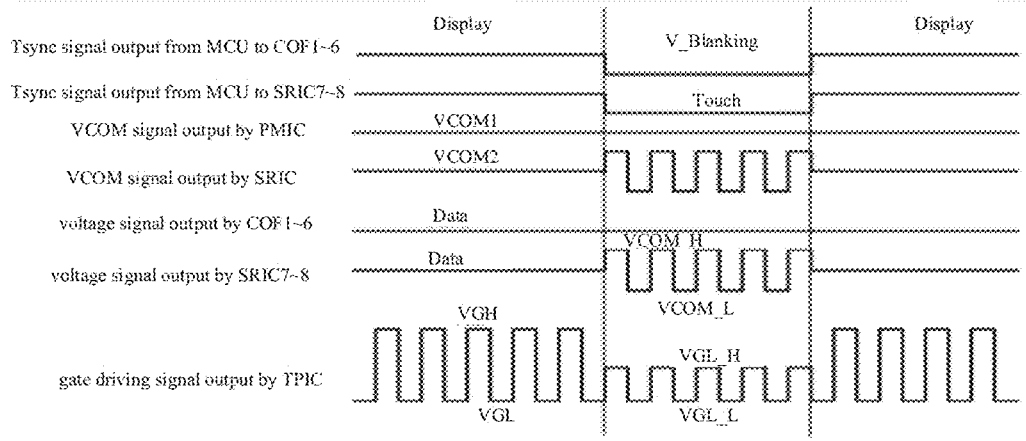
FIG. 5 is a driving timing diagram of a display panel according to an embodiment of the present disclosure.

Optionally, the display panel 10 further includes: a timer control register TCON (Timer Control Register) 22, a microcontroller MCU ((Microprogrammed Control Unit) 23, a power management integrated circuit 25 and a touch integrated circuit TPIC (Touch Integrated Circuit For Panel) 24, so as to achieve the display function of the non-touch region and the touch display function in the touch region in the present disclosure. As shown in FIGS. 1 and 5, the timer control register 22 is configured to output a touch enable signal Touch_EN and a gate enable signal GATE_EN in a touch stage (for example, a low level stage of a time synchronization signal Tsync). The microcontroller 23 is configured to output a touch clock synchronization signal Touch sync and a pulse width modulation wave PWM under a control of the touch enable signal Touch_EN. The power management integrated circuit 25 is configured to output a common voltage signal. The touch integrated circuit 24 is configured to output a first redundant parasitic capacitance signal VCOM_M based on the pulse width modulation PWM wave and the common voltage signal, and to output a second redundant parasitic capacitance signal GATE_M based on the gate enable signal GATE_EN, under a control of the touch clock synchronization signal Touch sync. The first redundant parasitic capacitance signal VCOM_M and the second redundant parasitic capacitance signal GATE_M are used to eliminate parasitic capacitance on the display panel. Generally, the display panel is provided with the time synchronization signal Tsync. In the present disclosure, a high level stage of the time synchronization signal Tsync is used as the display stage, and a low level stage of the time synchronization signal Tsync is used as the touch stage to describe the present disclosure in detail, but the present disclosure is not limited hereto.

Figure 2:
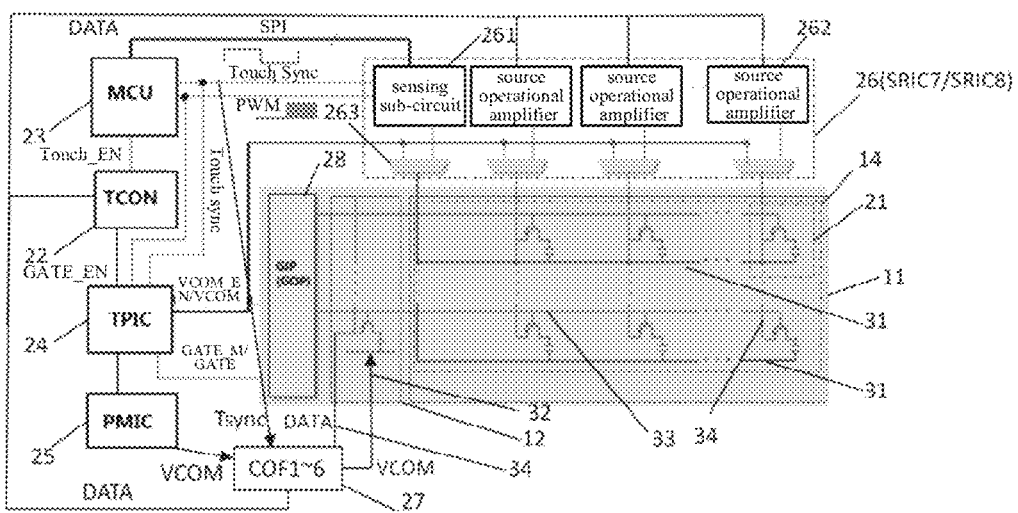
FIG. 2 is a schematic diagram illustrating a structure of a display panel according to an embodiment of the present disclosure.

FIG. 2 is a schematic diagram illustrating a structure of a display panel according to an embodiment of the present disclosure. As shown in FIG. 2, the display panel 10 further includes a plurality of pixel units 21 arranged in multiple rows and multiple columns and a plurality of first signal lines 31 in the display zone. FIG. 2 shows merely a plurality of pixel units 21 arranged in multiple rows and multiple columns in the touch region 11 of the display panel 10, but it is known that there are also a plurality of pixel units 21 arranged in multiple rows and multiple columns in the non-touch region 12.

Figure 3A:
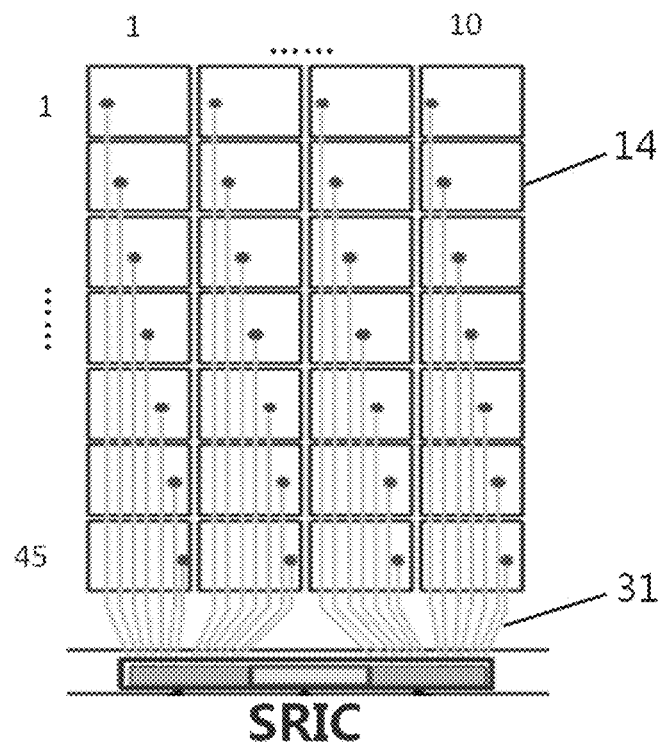
FIG. 3A is a schematic diagram illustrating a structure of sensing sub-regions in a touch region according to an embodiment of the present disclosure.
Figure 3B:
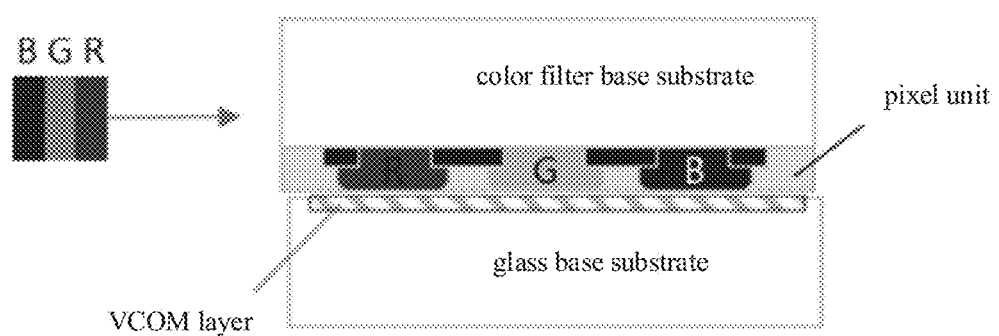
FIG. 3B is a schematic diagram illustrating a structure of a pixel unit in a touch region according to an embodiment of the present disclosure.

The at least one touch region 11 may be divided into a plurality of sensing sub-regions 14 (sensing blocks). Each of the plurality of sensing sub-regions 14 includes adjacent selected number of pixel units 21. The plurality of sensing sub-regions 14 are in one to one correspondence with the plurality of first signal lines 31 respectively, and common electrodes of the pixel units in each of the sensing sub-regions 14 are respectively coupled to corresponding first signal line 31. FIG. 3A is a schematic diagram illustrating a structure of sensing sub-regions in a touch region according to an embodiment of the present disclosure, and FIG. 3B is a schematic diagram illustrating a structure of a pixel unit in a touch region according to an embodiment of the present disclosure. As shown in FIG. 3A, the touch region 11 includes 45×10 sensing sub-regions 14. In the display stage, a common voltage signal is provided to the pixel units in the corresponding sensing sub-region 14 through one of the plurality of first signal lines 31. In the present disclosure, in the display stage, the common voltage signal is provided to one sensing sub-region 14 through one first signal line 31, that is, the number of sensing sub-regions 14 in the touch region 11 is equal to the number of the first signal lines 31. That is, in the touch region 11, the common electrodes (a common voltage layer) of the pixel units 21 in each of the plurality of sensing sub-regions 14 may be formed as a single piece, while the common electrodes of the sensing sub-regions 14 are independent of each other, so the common voltage signals shall be provided to the sensing sub-regions 14 respectively. As shown in FIG. 3B, as shown on the left side, one pixel unit may include three sub pixels: one red (R) sub-pixel, one green (G) sub-pixel and one blue (B) sub-pixel, and as shown on the right side, the corresponding cross-sectional structure includes a glass base substrate, a common electrode (VCOM) layer, a pixel unit, and a color filter base substrate arranged in sequence.

Optionally, the display panel 10 further includes one second signal line 32, and a plurality of pixel units 21 in the at least one non-touch region 12 are coupled to the second signal line 32, as shown in FIG. 2. That is, in the at least one non-touch region 12, common voltage layers of the pixel units 21 may be formed as a single piece, and only one common voltage signal is provided.

Optionally, the display panel 10 further includes at least one sensing and source driving integrated circuit SRIC (i.e., Source Driver & touch function integrated circuit) 26. As shown in FIG. 2, the at least one sensing and source driving integrated circuit 26 is coupled to the microcontroller 23 and the touch integrated circuit 24, and is coupled to the pixel units in the plurality of sensing sub-regions 14 through the plurality of first signal lines 31. The at least one sensing and source driving integrated circuit 26 is configured to sense touch against each of the plurality of sensing sub-regions 14 (including the at least one touch button and the plurality of touch keys in the predetermined screen) by means of the plurality of first signal lines 31 based on the touch clock synchronization signal Touch sync and the pulse width modulation wave PWM in the touch stage, and to send the first redundant parasitic capacitance signal VCOM_M to the plurality of pixel units 21 in the at least one touch region 11 through the plurality of first signal lines 31 and the plurality of data lines 34 respectively. Moreover, in the display stage, the at least one sensing and source driving integrated circuit 26 may further respectively send data signals to a plurality of pixel unit columns in the at least one touch region 11 through the plurality of data lines respectively, and send the common voltage signal to the common electrodes of the plurality of pixel units 21 in the at least one touch region 11. In other words, the at least one sensing and source driving integrated circuit 26 integrates a sensing function and a source driving function.

Specifically, as shown in FIG. 2, each of the at least one sensing and source driving integrated circuit 26 includes at least one sensing sub-circuit 261, at least one source operational amplifier 262, and at least one multiplexer 263 coupled to the at least one sensing sub-circuit 261 and the at least one source operational amplifier 262 in one to one correspondence. The at least one sensing sub-circuit 261 is further coupled to the microcontroller 23. Multiplexers 263 coupled to the at least one sensing sub-circuit 261 and the at least one source operational amplifier 262 in one to one correspondence are further coupled to the touch integrated circuit 24 respectively. The at least one sensing sub-circuit 261 is coupled to at least some of the plurality of first signal lines 31 through the corresponding multiplexer 263 for sensing touch signals in the sensing sub-regions 14, and then determines touch positions. The at least one source operational amplifier 262 is coupled to a corresponding data line in the at least one touch region 11 through a corresponding multiplexer 263. FIG. 2 shows that the display panel 10 includes two sensing and source driving integrated circuits, SRIC 7 and SRIC 8, and the number of sensing and source driving integrated circuits may be other numbers as required. The process of touch sensing and source driving using the at least one sensing and source driving integrated circuit 26 will be described in detail below.

Optionally, the display panel further includes a gate driving circuit 28 and at least one source driving circuit 27. As shown in FIG. 2, the gate driving circuit GIP/GOP (Gate In Panel/Gate On Panel) 28 is coupled to the touch integrated circuit 24, and is coupled to a plurality of pixel unit rows in the display panel through a plurality of gate lines 33. The gate driving circuit GIP/GOP 28 is configured to provide a gate driving signal to the plurality of pixel unit rows in the display panel through the plurality of gate lines based on a gate voltage signal GATE output by the touch integrated circuit 24 in the display stage, and provides the second redundant parasitic capacitance signal GATE_M to the plurality of pixel unit rows in the display panel through the plurality of gate lines in the touch stage respectively. The at least one source driving circuit 27 is coupled to the microcontroller 23, and is coupled to the plurality of pixel units in the at least one non-touch region 12 through the plurality of data lines 34. The at least one source driving circuit 27 is configured to provide source driving signals to a plurality of pixel unit columns in the non-touch region 12 based on the data signals (DATA) in the display stage respectively. FIG. 2 shows that the display panel includes chip-on-chip thin film integrated circuits COF1~COF6, and the COF1~COF6 are used as the source driving circuits for providing the source driving signals to the pixel unit columns in the at least one non-touch region 12 respectively. The number of source driving circuits 27 may be provided with other numbers as required.

Optionally, the power management integrated circuit 25 of the display panel is further coupled to the at least one source driving circuit 27 and configured to provide the common voltage signal to the pixel units in the at least one non-touch region 12 via the second signal lines 32 by the at least one source driving circuit 27 in the display stage, as shown in FIG. 2. The timer control register 22 is further coupled to the touch integrated circuit 24 and is configured to output the gate enable signal GATE_EN to the touch integrated circuit 24 in the display stage, to enable the touch integrated circuit 24 output the gate voltage signal GATE based on the gate enable signal GATE_EN.

Optionally, an area of the at least one touch region 11 may be ¼ of an area of the display zone, and may be located on a side of the display zone proximal to an edge of the display panel, as shown in FIG. 1. Alternatively, a proportion of the area of the touch region 11 to the area of the display zone may be provided with other values as required, and the touch region 11 may also be located in other positions in the display zone.

As shown in FIG. 5, the microcontroller 23 may output the touch clock synchronization signal Touch sync under a control of the touch enable signal Touch_EN. The touch stage corresponds to a low level stage of the time synchronization signal Tsync of the display panel, and the display stage corresponds to a high level stage of the time synchronization signal Tsync of the display panel. As a touch detection signal, PWM is a periodic square wave signal and its period is less than a period of the time synchronization signal Tsync. In the display stage, the timer control register 22, the microcontroller 23, the touch integrated circuit 24, and the sensing and source driving integrated circuit 26 do not perform the touch display function, but only perform the normal display function.

As shown in FIG. 1, the timer control register TCON 22, the microcontroller MCU 23, the touch integrated circuit TPIC 24, and the power management integrated circuit PMIC 25 send touch ADC (Analog to Digital Converter) signals to a front-end system (such as display function control modules, etc.) through connection ports CNT for display adjustment.

In the present disclosure, the touch function is achieved in some regions of a conventional display by adding touch design on the display panel (i.e., adding a touch function circuit design to the circuit), thereby replacing OSD physical keys and increasing user touch function experience. In addition, compared with a full screen touch display, the local touch display has obvious cost advantages, wider range of application, and higher market value, and can be quickly applied to products.

According to an aspect of the present disclosure, a display device is further provided, which includes the display panel described above and a peripheral driving circuit for driving the display panel. The display device of the present disclosure may be, for example, a liquid crystal touch display device. By using the above display panel, the OSD physical keys can be replaced, the user touch function experience can be increased, cost advantages are obvious, the range of application is wider, the market value is higher, and the product application can be achieved quickly.

Figure 4:
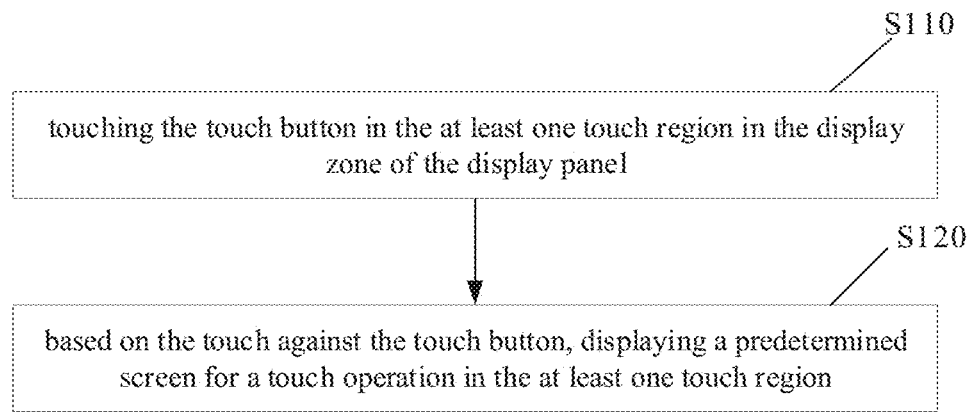
FIG. 4 is a flow chart of a driving method for a display panel according to an embodiment of the present disclosure.

According to another aspect of the present disclosure, a driving method for a display panel is further provided. FIG. 4 is a flow chart of a driving method for a display panel according to an embodiment of the present disclosure, and FIG. 5 is a driving timing diagram of a display panel according to an embodiment of the present disclosure. The driving method for the display panel of the present disclosure is described in detail with reference to FIGS. 2, 4 and 5 below. As shown in FIG. 4, the driving method of the present disclosure includes steps S110 to S120.

In step S110, the touch button in the at least one touch region in the display zone of the display panel is touched. Specifically, in this stage, the touch button in the at least one touch region in the display zone is touched, thereby generating the touch signals for the touch button.

In step S120, the predetermined screen capable of performing touch operation is displayed in the at least one touch region based on the touch against the touch button. Optionally, the predetermined screen includes the plurality of touch keys. Specifically, in this stage, based on the received touch signals, the predetermined screen including the plurality of touch keys, such as a screen menu, may be displayed in the at least one touch region. Moreover, during the display of the predetermined screen, the display screen in the non-touch region does not change.

Hereinafter, referring to FIGS. 2, 4 and 5, the driving method in the touch stage and the display stage in the display panel of the present disclosure will be described in detail respectively.

In the touch stage of the display panel, firstly, the timer control register 22 outputs the touch enable signal Touch_EN and the gate enable signal GATE_EN. Then, under the control of the touch enable signal Touch_EN, the microcontroller 23 outputs the touch clock synchronization signal Touch sync and the pulse width modulation wave PWM. Then, the power management integrated circuit 25 outputs the common voltage signal. Then, under the control of the touch clock synchronization signal Touch sync, the touch integrated circuit 24 outputs the first redundant parasitic capacitance signal VCOM_M based on the common voltage signal and the pulse width modulation wave PWM, and outputs the second redundant parasitic capacitance signal GATE_M based on the gate enable signal GATE_EN. As shown in FIG. 5, in the low level stage V_Blanking of the time synchronization signal Tsync, the first redundant parasitic capacitance signal VCOM_M in a form of a square wave is output to the SRIC7 and SRIC8 by the touch integrated circuit 24. The first redundant parasitic capacitance signal VCOM_M in the form of a square wave may be formed by superposing a DC common voltage signal to the pulse width modulation wave PWM. The second redundant parasitic capacitance signal GATE_M is generated by the touch integrated circuit based on the gate enable signal GATE_EN. The first redundant parasitic capacitance signal VCOM_M and the second redundant parasitic capacitance signal GATE_M are used to eliminate parasitic capacitance on the display panel.

Next, through the multiplexers 263 coupled to the at least one sensing sub-circuit 261 and the plurality of first signal lines 31, and through the multiplexer 263 coupled to the at least one source operational amplifier 262, the first redundant parasitic capacitance signal VCOM_M is input to the common electrodes of the pixel units in the at least one touch region and the data lines 34 of the display panel. Then, the second redundant parasitic capacitance signal GATE_M is input to the gate lines corresponding to the pixel units in the at least one touch region 11 of the display panel through the gate driving circuit 28. Finally, the at least one sensing sub-circuit 261 senses the touch against the at least one touch and the plurality of touch keys in the predetermined screen in the at least one touch region 11 via the plurality of first signal lines 31 through corresponding multiplexer, based on the touch clock synchronization signal Touch sync and the pulse width modulation wave PWM output by the microcontroller.

After sensing the touch against the at least one touch button 13 and the plurality of touch keys in the predetermined screen in the at least one touch region 11, the at least one sensing sub-circuit 261 generates the touch signals and sends the touch signals to the microcontroller 23 via a serial peripheral interface such as SPI (a Serial Peripheral Interface). The microcontroller 23 then sends the touch signals to the front-end system through the SPI and the connection port CNT, thereby achieving the parameter adjustment of the display panel.

In the display stage of the display panel, firstly, the timer control register 22 outputs a display enable signal Display_EN and the gate enable signal GATE_EN. Then, the microcontroller 23 outputs the time synchronization signal Tsync under the control of the display enable signal Display_EN. Then, the power management integrated circuit 25 outputs the common voltage signal. Then, the touch integrated circuit 24 outputs the common voltage signal VCOM1 provided by the power management integrated circuit 25 under the control of the time synchronization signal Tsync, and outputs the gate voltage signal GATE under the control of the gate enable signal GATE_EN.

Next, the display of the display screen of the display panel is achieved by performing the following operations in parallel: through the multiplexers 263 coupled to the at least one sensing sub-circuit 261 and the plurality of first signal lines 31, and the multiplexer 263 coupled to the at least one source operational amplifier 262, inputting the common voltage signal VCOM1 from the touch integrated circuit 24 and the data signals DATA to the common electrodes of the pixel units in the at least one touch region and the data lines of the display panel respectively; the gate driving circuit 28 providing the gate driving signal to the plurality of pixel unit rows in the display panel through the plurality of gate lines based on the gate voltage signal GAIL output by the touch integrated circuit 24; the at least one source driving circuit 27 sending the data signals DATA to the plurality of pixel unit columns in the at least one non-touch region 12 of the display panel through the data lines under the control of time synchronization signal Tsync provided by the microcontroller 23; and the power management integrated circuit 25 also providing a common voltage signal VCOM2 to the pixel units in the at least one non-touch region 12 by at least one source driving circuit 27 via the second signal line 32. The common voltage signal VCOM1 may be equal to the common voltage signal VCOM2, and both may be DC signals.

As shown in FIG. 5, in the present disclosure, the operation process of the display panel is divided into the touch stage Touch (corresponding to the V_Blanking stage) and the display stage Display based on the time synchronization signal tsync of the display panel. The touch stage corresponds to the low level stage of the time synchronization signal of the display panel, and the display stage corresponds to the high level stage of the time synchronization signal. According to FIG. 5, the touch detection signal PWM is a periodic square wave signal and its period is less than the period of the time synchronization signal, the touch enable signal corresponds to a falling edge of the time synchronization signal, and the display enable signal Display_EN corresponds to a rising edge of the time synchronization signal.

In the present disclosure, it should be noted that, in a first touch stage, the touch button 13 is touched, and in a subsequent first display stage, the predetermined screen including the touch keys is displayed in the touch region 11, while a previous display screen is still displayed in the non-touch region without being changed. In a next second touch stage, the touch keys in the predetermined screen are touched. In a subsequent second display stage, a display screen after the parameters of the display panel are adjusted is displayed in the touch region 11 and the non-touch region 12, while the predetermined screen including the touch keys may be automatically hide. The display of the touch button 13 and the touch keys of the predetermined screen may be achieved by calling corresponding display screen data pre-stored in the memory.

Meanwhile, as shown in FIG. 5, in the touch stage, the first redundant parasitic capacitance signal GATE_M (with a high level VGL_H and a low level VGL_L) in the form of a periodic square wave may be provided by the gate driving circuit to eliminate some of parasitic capacitance on the display panel. In the touch stage, the amplitude of the first redundant parasitic capacitance signal GATE_M is smaller than the amplitude of the gate driving signal (with a high level VGH and a low level VGL) provided by the gate driving circuit in the display stage. The first redundant parasitic capacitance signal GATE_M in the touch stage and the gate voltage signal GATE in the display stage are both generated by the touch integrated circuit 24 based on the gate enable signal GATE_EN, but their amplitudes are different. The first redundant parasitic capacitance signal GATE_M in the touch stage is not enough to turn on the gates of the transistors in the display panel.

Optionally, the driving method of the present disclosure further includes uniform adjusting the brightness in the at least one touch region and the brightness in the at least one non-touch region, for example, the uniform adjusting of the brightness of the display panel may be performed by brightness compensation, precise color control, and the like.

In the present disclosure, by adopting the above mentioned display panel and its driving method, the physical OSD keys can be replaced, the user touch function experience can be increased, the cost can be reduced, the range of application is wider, the market value is higher, and the product application can be achieved quickly.

It should be understood that, the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the disclosure, and these changes and modifications are to be considered within the scope of the disclosure.

What is claimed is:

1. A display panel, comprising a display zone comprising at least one touch region, where a touch operation can always be accepted/performed, and at least one non-touch region, where a touch operation can never be accepted/performed, each of the at least one the touch region being located at a side of each of the at least non-touch region, wherein the display panel further comprises at least one touch button in the at least one touch region, and the at least one touch button is configured to enable, when touched, the at least one touch region to display a predetermined screen for a touch operation;

wherein the predetermined screen is provided with a plurality of touch keys;

the display panel further comprises:

a timer control register configured to output a touch enable signal and a gate enable signal in a touch stage;

a microcontroller configured to output a touch clock synchronization signal and a pulse width modulation wave under a control of the touch enable signal;

a power management integrated circuit configured to output a common voltage signal; and a touch integrated circuit configured to output a first redundant parasitic capacitance signal based on the pulse width modulation wave and the common voltage signal, and to output a second redundant parasitic capacitance signal based on the gate enable signal, under a control of the touch clock synchronization signal; and the display panel further comprises: a plurality of pixel units arranged in multiple rows and multiple columns and a plurality of first signal lines in the display zone, wherein each of the at least one touch region is divided into a plurality of sensing sub-regions, each of the plurality of sensing sub-regions comprises a selected number of pixel units adjacent to each other, and the plurality of sensing sub-regions correspond to the plurality of first signal lines in a one to one correspondence, and common electrodes of the pixel units in each of the plurality of sensing sub-regions are coupled to a corresponding first signal line, respectively; and the display panel further comprises only one second signal line coupled to common electrodes of pixel units in the at least one non-touch region.

2. The display panel of claim 1, wherein the common electrodes of the pixel units in each of the plurality of sensing sub-regions are formed as a single piece, common electrodes of the plurality of sensing sub-regions are independent of each other, and the common electrodes of the pixel units in the at least one non-touch region are formed as a single piece.

3. The display panel of claim 2, further comprising at least one sensing and source driving integrated circuit, wherein the at least one sensing and source driving integrated circuit is:
coupled to the microcontroller and the touch integrated circuit, and coupled to the pixel units in the plurality of sensing sub-regions through the plurality of first signal lines, and
configured: in the touch stage, to sense touch against the at least one touch button and the plurality of touch keys in the predetermined screen through the plurality of first signal lines based on the touch clock synchronization signal and the pulse width modulation wave output by the microcontroller, to send touch signals to the microcontroller, and to send the first redundant parasitic capacitance signal to the plurality of pixel units in the at least one touch region through the plurality of first signal lines and a plurality of data lines respectively, and
in a display stage, to send data signals to a plurality of pixel unit columns in the at least one touch region through the plurality of data lines respectively, and to send the common voltage signal to the common electrodes of the plurality of pixel units in the at least one touch region through the plurality of first signal lines, respectively.

4. The display panel of claim 3, wherein each of the at least one sensing and source driving integrated circuit comprises at least one sensing sub-circuit, at least one source operational amplifier and multiplexers coupled to the at least one sensing sub-circuit and the at least one source operational amplifier in a one to one correspondence, wherein
the at least one sensing sub-circuit is further coupled to the microcontroller, and the multiplexers coupled to the at least one sensing sub-circuit and the at least one source operational amplifier in a one to one correspondence are further coupled to the touch integrated circuit respectively, the at least one sensing circuit is coupled to at least some of the plurality of first signal lines through corresponding multiplexers, and the at least one source operational amplifier is coupled to corresponding data lines in the at least one touch region through corresponding multiplexers.

5. The display panel of claim 4, further comprising:
a gate driving circuit coupled to the touch integrated circuit and a plurality of pixel unit rows in the display zone respectively, wherein the gate driving circuit is configured, in the display stage, to provide a gate driving signal to the plurality of pixel unit rows in the display panel through a plurality of gate lines based on a gate voltage signal output by the touch integrated circuit, and in the touch stage to provide the second redundant parasitic capacitance signal to the plurality of pixel unit rows in the display panel through the plurality of gate lines respectively; and
at least one source driving circuit coupled to the microcontroller, wherein the at least one source driving circuit is configured to provide data signals to a plurality of pixel unit columns in the at least one non-touch region through the plurality of data lines under a control of the microcontroller in the display stage.

6. The display panel of claim 4, wherein
the power management integrated circuit is further coupled to the at least one source driving circuit, and is configured to provide the common voltage signal to the pixel units in the at least one non-touch region via the second signal line through the at least one source driving circuit in the display stage; and
the timer control register is further configured to output the gate enable signal to the touch integrated circuit in the display stage, such that the touch integrated circuit outputs the gate voltage signal based on the gate enable signal.

7. The display panel of claim 1, wherein the touch stage corresponds to a low level stage of the time synchronization signal of the display panel, a high-level stage of the time synchronization signal corresponds to the display stage of the display panel, the pulse width modulation wave is a touch detection signal of the display panel and has a period less than a period of the time synchronization signal, and the touch enable signal corresponds to a falling edge of the time synchronization signal.

8. The display panel of claim 1, wherein
an area of the at least one touch region is ¼ of an area of the display zone, the at least one touch region is on a side of the at least one non-touch region proximal to an edge of the display panel, and the at least one touch button is located at any position in the at least one touch region, and
the plurality of touch keys comprise a screen parameter menu at least comprising a brightness adjusting bar and a contrast adjusting bar.

9. A display device, comprising the display panel of claim 1 and a peripheral driving circuit for driving the display panel.

10. A driving method for a display panel, wherein the display panel comprises a display zone comprising at least one touch region, where a touch operation can always be accepted/performed, and at least one non-touch region, where a touch operation can never be accepted/performed, and each of the at least one the touch region is located at a side of each of the at least non-touch region, and each of the at least one touch region comprises a touch button,
the driving method comprises:
touching the touch button in the at least one touch region in the display zone of the display panel; and
based on a touch against the touch button, displaying a predetermined screen for a touch operation in the at least one touch region, wherein the predetermined screen is provided with a plurality of touch keys;
the driving method further comprises: in a touch stage,
outputting, by a timer control register, a touch enable signal and a gate enable signal;
outputting, by a microcontroller, a touch clock synchronization signal and a pulse width modulation wave under a control of the touch enable signal;
outputting, by a power management integrated circuit, a common voltage signal; and
outputting, by a touch integrated circuit, a first redundant parasitic capacitance signal based on the pulse width modulation wave and the common voltage signal, and a second redundant parasitic capacitance signal based on the gate enable signal, under a control of the touch clock synchronization signal;
the display method further comprises: in the touch stage, detecting the touch against at least one touch button and the plurality of touch keys in the predetermined screen, wherein detecting the touch against the at least one touch button and the plurality of touch keys in the predetermined screen comprises:

inputting the first redundant parasitic capacitance signal to common electrodes of the pixel units and data lines in the at least one touch region of the display panel through multiplexers and a plurality of first signal lines coupled to at least one sensing sub-circuit and through multiplexers coupled to at least one source operational amplifier respectively;

inputting, by a gate driving circuit, the second redundant parasitic capacitance signal to gate lines of the pixel units in the at least one touch region of the display panel; and sensing, by the at least one sensing sub-circuit, the touch against the at least one touch button and the plurality of touch keys in the predetermined screen in the at least one touch region via the plurality of first signal lines through corresponding multiplexers based on the touch clock synchronization signal and the pulse width modulation wave output by the microcontroller, and sending touch signals to the microcontroller;

the driving method further comprises: in a display stage, outputting, by the timer control register, a display enable signal and the gate enable signal;

outputting, by the microcontroller, a time synchronization signal under a control of the display enable signal;

outputting, by the power management integrated circuit, the common voltage signal; and outputting, by the touch integrated circuit, the common voltage signal provided by the power management integrated circuit under a control of the time synchronization signal, and outputting a gate voltage signal under a control of the gate enable signal; and the driving method further comprises, in the display stage, providing the common voltage signal from the touch integrated circuit to the common electrodes of the pixel units in the at least one touch region of the display panel through the multiplexers and the plurality of first signal lines coupled to the at least one sensing sub-circuit and through the multiplexers coupled to the at least one source operational amplifier, and providing data signals to a plurality of pixel unit columns in the at least one touch region of the display panel through a plurality of data lines respectively;

providing, by a gate driving circuit, a gate driving signal to a plurality of pixel unit rows in the display panel through a plurality of gate lines based on the gate voltage signal output by the touch integrated circuit;

providing, by at least one source driving circuit, data signals to a plurality of pixel unit columns in the at least one non-touch region of the display panel through a plurality of data lines under a control of the time synchronization signal provided by the microcontroller; and providing, by the power management integrated circuit, the common voltage signal to the pixel units in the at least one non-touch region via only one second signal line through the at least one source driving circuit.

11. The driving method of claim 10, wherein the touch stage corresponds to a low level stage of the time synchronization signal of the display panel, a high-level stage of the time synchronization signal corresponds to the display stage of the display panel, the pulse width modulation wave is a touch detection signal of the display panel and has a period less than a period of the time synchronization signal, the touch enable signal corresponds to a falling edge of the time synchronization signal, and the display enable signal corresponds to a rising edge of the time synchronization signal.

12. The driving method of claim 10, further comprising uniformly adjusting the brightness in the at least one touch region and the brightness in the at least one non-touch region.

* * * * *